(12) United States Patent
Hicks

(10) Patent No.: US 6,640,850 B1
(45) Date of Patent: Nov. 4, 2003

(54) TREE HARVESTING APPARATUS

(75) Inventor: Keith B. Hicks, Big Rock, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 10/195,003

(22) Filed: Jul. 11, 2002

(51) Int. Cl.[7] ............................................... A01G 23/08
(52) U.S. Cl. ..................... 144/4.1; 144/34.1; 144/336
(58) Field of Search ........................ 144/4.1, 34.1, 144/34.5, 336; 83/853, 855, 928

(56) References Cited

U.S. PATENT DOCUMENTS

| | | |
|---|---|---|
| 4,446,897 A | 5/1984 | Kurelek |
| 4,727,916 A | 3/1988 | Sigouin |
| 4,909,291 A | 3/1990 | Tremblay |
| 4,987,935 A | 1/1991 | Corcoran et al. |
| 5,004,026 A | 4/1991 | MacKebbab et al. |
| 5,113,919 A | 5/1992 | MacLennan |
| 5,377,731 A | 1/1995 | Wildey |
| 5,697,412 A | 12/1997 | Kurelek |
| 5,794,674 A | 8/1998 | Kurelek |
| 5,931,210 A | 8/1999 | Kurelek |
| 6,152,201 A | 11/2000 | Kurelek |

*Primary Examiner*—W. Donald Bray
(74) *Attorney, Agent, or Firm*—James R Smith

(57) ABSTRACT

A tree harvesting apparatus is provided. The harvesting apparatus comprises a frame member, a cutting device mounted to the frame member, and at least one cutting member attached to the cutting device. A base member partially overlays the cutting device. A tree accumulation member is positioned adjacent the base member and is co-planar therewith and extends over at least a portion of the cutting member.

19 Claims, 4 Drawing Sheets

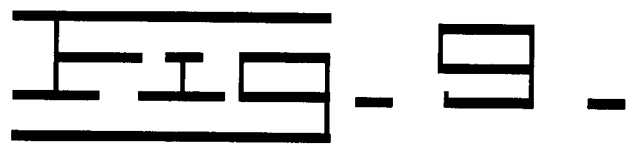
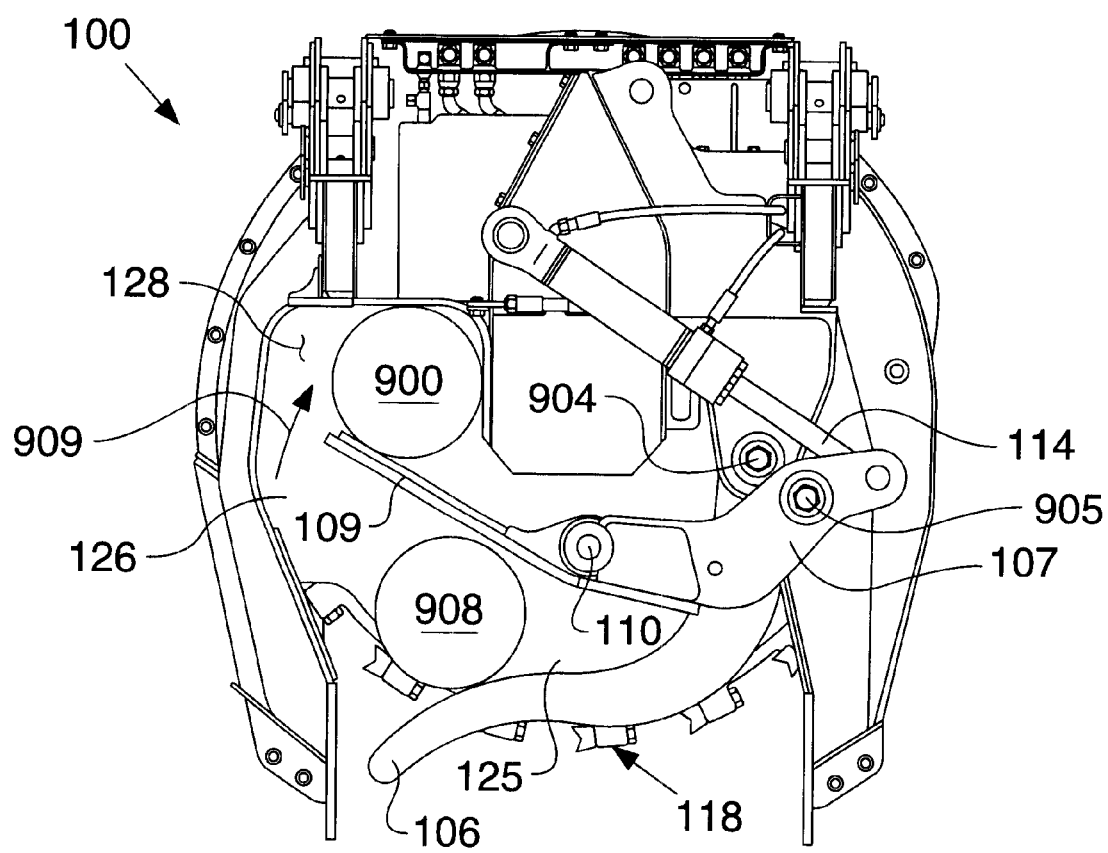

TREE HARVESTING APPARATUS

TECHNICAL FIELD

What is provided is a tree harvesting apparatus and, more specifically, a tree harvesting apparatus for severing and accumulating severed trees.

BACKGROUND

In the harvesting of trees, it is typical to mount a tree harvesting apparatus to the boom of a carrier vehicle such as a feller buncher or crawler tractor. The harvesting apparatus referred to herein is typically referred to as a harvesting or cutting head which typically employs a circular cutting saw to sever the tree, a means to grip and hold the tree while and after the tree is severed, and a base member which partially overlays the circular saw for supporting the tree off of the circular saw as the tree is being cut. Those cutting heads which accumulate the trees on the head itself oftentimes employ a tree accumulation plate or member for supporting the severed trees. In recent years, machine productivity has been become a major issue since the end users of such machines are increasingly under pressure to make a return on their investments in the forestry industry. To this end, it has been found to be desirable to provide the cutting heads with the ability to transport a greater number of trees.

In order to accomplish the aforementioned objective, however, it is necessary to overcome certain design restrictions in the design of the cutting head itself. For instance, increasing the tree accumulation area by increasing the diameter of the circular saw results in a much larger cutting head than that which is actually needed to cut through the largest desired tree. Furthermore, extending the tree accumulation area out over the teeth of the cutting saw requires sufficient clearance between the accumulation member and teeth to prevent contact between the two when the tree accumulation area is subject to the weight of the trees. In addition, for those arrangements in which the base member and accumulation member comprise a unitary structure, elevating the accumulation member as described above causes the base member to be further elevated above the cutting plane of the circular saw which may impede the cutting of the tree by causing the tree to wedge onto the base member.

There currently exist numerous prior art attempts to increase the area available to store severed trees. For example, U.S. patent application Ser. No. 5,794,674 which issued to Kurelek on Aug. 18, 1998, teaches a felling and accumulating head which utilizes an accumulation area which is elevated in respect to a base plate and connected therewith by a ramp. Although the aforementioned arrangement may be adequate for its respective intended purpose, it still requires the need for three separate parts (e.g., base plate, ramp and accumulation area) which may add to the complexity and cost of the design. Also, U.S. Pat. No. 4,446,897, which issued to Kurelek on May. 8, 1984, teaches a felling head in which the accumulation member only extends to the teeth of the circular saw. Although this design may also be adequate for its intended purpose, the inability of the accumulation member to extend past the teeth of the circular saw limits its tree storage capacity.

The present invention is directed to overcoming one or more of the problems as set forth above.

SUMMARY OF THE INVENTION

In an embodiment of the present invention, a harvesting apparatus is provided. The harvesting apparatus comprises a frame member, a cutting device mounted to the frame member, and at least one cutting member attached to the cutting device. A base member partially overlays the cutting device, and a tree accumulation member is positioned adjacent the base member and is coplanar therewith and extends over at least a portion of the cutting member.

In another embodiment of the present invention, a harvesting apparatus is provided. The harvesting apparatus comprises a frame member, a cutting device mounted to the frame member and having a central portion and a rim portion. A support plate partially overlays the cutting device and is separated from the cutting device by a separation distance increasing from a location adjacent the central portion to the outer rim portion.

In yet another embodiment of the present invention, a cutting device is provided. The cutting device comprises a central portion and an outer rim portion. A cutting tooth is attached to the outer rim portion and defines an upper and lower cutting plane. The cutting device further comprises a web portion, having a web portion upper surface, separated from the upper cutting plane adjacent the central portion by a first distance, and separated from the upper cutting plane adjacent the outer rim portion by a second distance wherein the second distance is greater than the first distance.

BRIEF DESCRIPTION OF THE DRAWINGS

FIG. 9 is a partial top view of the tree harvesting apparatus of FIG. 1 shown holding and accumulating severed trees.

DETAILED DESCRIPTION

Figure 1:
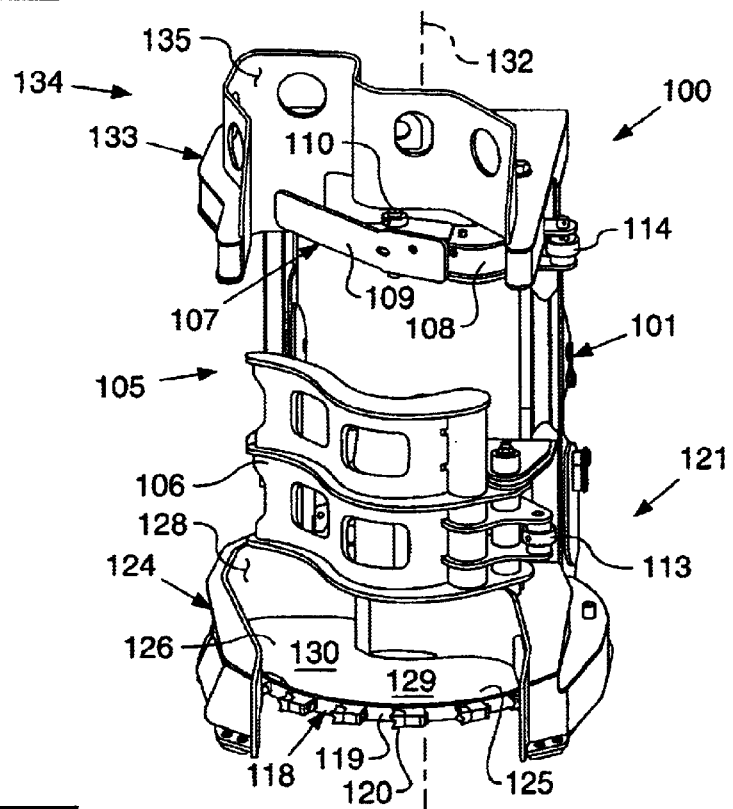
FIG. 1 is a perspective view of a tree harvesting apparatus incorporating the teachings of the present invention.

With reference now to the Figures, shown in FIG. 1 is a harvesting apparatus 100 of the present invention for use in cutting and transporting trees. The harvesting apparatus 100 includes a frame member 101, which is coupled in a conventional manner to a carrier vehicle (not shown). Attached to the frame member 101 is a tree securing device 105 which may comprise, in an embodiment described herein, a grapple arm 106 and a collector arm 107. The collector arm 107 includes a base portion 108 and an articulable portion 109 which articulates in a conventional manner, such as by use of a rubberband spring (not shown), about the pivot point denoted 110. Although additional details regarding both the grapple arm 106 and collector arm 107 will be provided as this disclosure progresses, suffice to say for now both the grapple arm 106 and collector arm 107 are pivotally movable relative to the frame member 101 by, respectively, a first hydraulic cylinder 113 and a second hydraulic cylinder 114.

Figure 2:
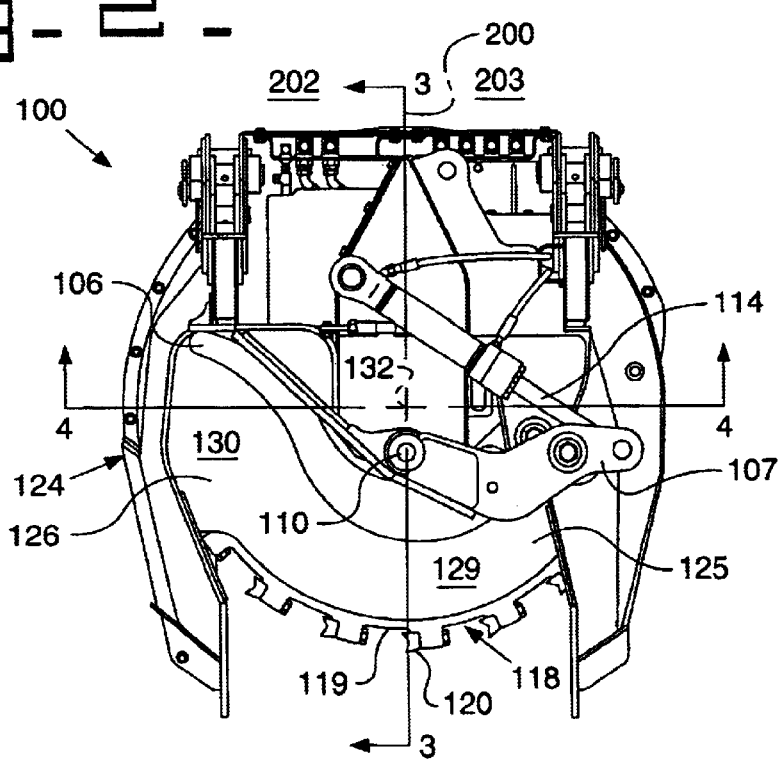
FIG. 2 is a partial top view of the tree harvesting apparatus of FIG. 1.

With further reference to FIG. 1 and introducing FIG. 2, shown is a cutting device 118 attached adjacent the bottom portion 121 of the frame member 101. In an embodiment described herein, the cutting device 118 comprises a circular saw having a periphery 119 with at least one cutting member 120 or tooth mounted thereon. A shroud 124 is attached to the frame member 101 and partially encompasses the cutting device 118, as shown. The harvesting apparatus 100 further includes a base member 125 which is structured and arranged to partially overlay the cutting device 118, and a tree accumulation member 126, both of which define herein a support plate. Both the accumulation member 126 and the base member 125 are coupled to the shroud 124 by a suitable attachment method, and the combination of the shroud 124 and accumulation member 126 define an accumulation area 128 for accumulating the severed trees.

To support the weight of the severed trees, both the base member 125 and tree accumulation member 126 may comprise a metallic, plastic or other material with sufficient strength and durability. In an embodiment of the present invention, the base member 125 and tree accumulation member 126 comprise a unitary structure; however, such a showing is exemplary only and other arrangements such as providing each base and accumulation member 125,126 as a separate unit may also be utilized. The base member 125 and tree accumulation member 126 both include respective top surfaces 129 and 130 which, when both the base and accumulation members 125,126 are coupled to the shroud 124, lie in substantially the same plane. In order to maximize the storage area for storing severed trees, an embodiment of the present invention provides for an extension of the tree accumulation member 126 behind the centerline 132 of the harvesting apparatus (as shown best in FIG. 2).). Additional storage area can be provided by extending the tree accumulation member 126 at least partially over the cutting members 120 (as shown best in FIG. 4). A support member 133 is attached adjacent the frame top portion 134 and is provided with a recessed portion 135 for receiving and supporting the severed trees.

With further reference to FIG. 2, shown is a line 200 passing through the centerline 132 of the harvesting apparatus 100 dividing the harvesting apparatus 100 into a first side 202 and a second side 203. In an embodiment of the present invention, each of the grapple and collector arms 106,107 are coupled to the frame member 101 on the same side (e.g., second side 203 as shown) of the harvesting apparatus 100. It is to be understood that such a showing is exemplary only and that other arrangements may also be utilized without deviating from the spirit of the present invention. Such other arrangements may include, for example, coupling both grapple and collector arms 106,107 to the frame member 101 on the first side 202 or coupling the grapple arm 106 on the first side 202 and coupling the collector arm 107 on the second side 203, or vice versa.

Figure 3:
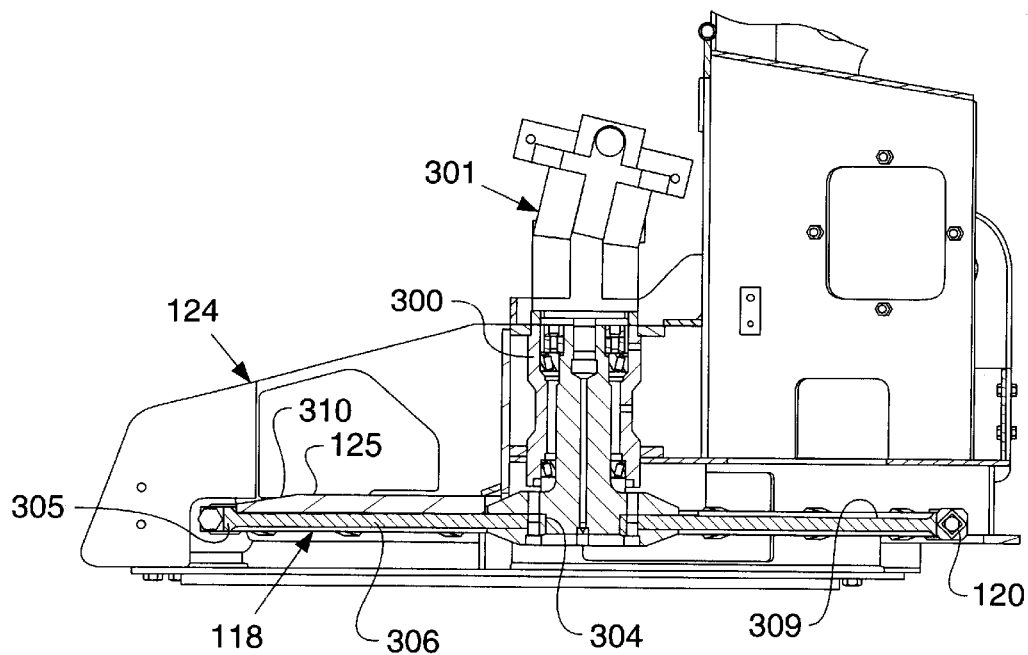
FIG. 3 is a cross-sectional view taken through section lines 3—3 in FIG. 2.
Figure 4:
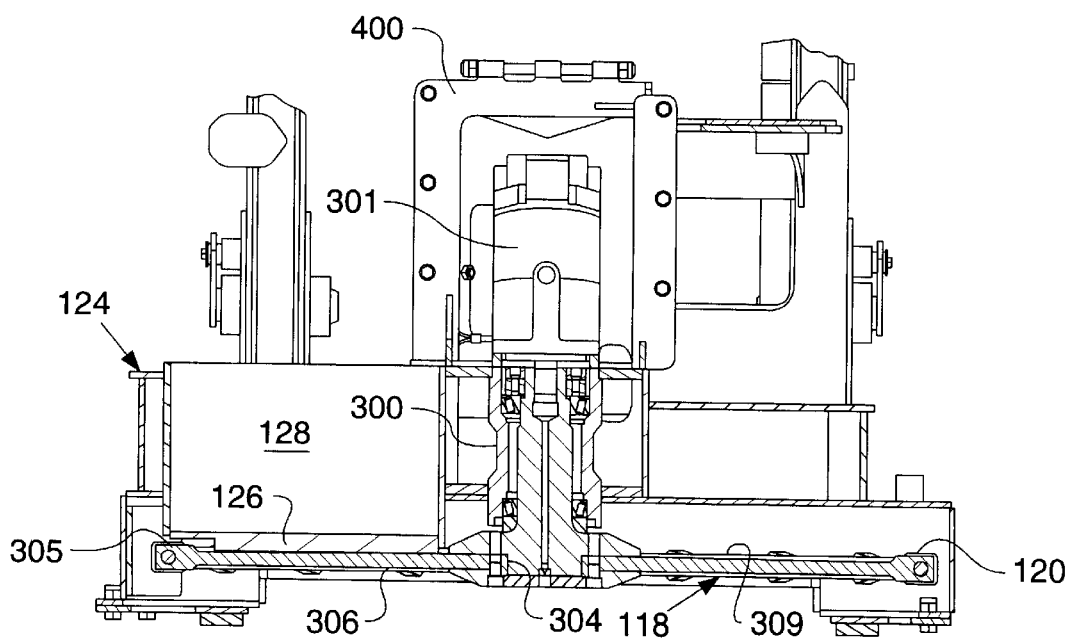
FIG. 4 is a cross-sectional view taken through section lines 4—4 in FIG. 2.

Shown in cross-section in FIGS. 3 and 4 are further details of the harvesting apparatus 100 of the present invention. The cutting device 118 is attached in a suitable manner to a spindle 300 which, in turn, is driven by a motor 301 that is housed within housing (shown at 400 in FIG. 4). For exemplary purposes, the motor 301 is shown comprising a hydraulic motor, however, and as should be apparent to those of ordinary skill in such art, any device may be used which can provide a torque to the circular saw sufficient to sever a tree. The cutting device 118 is shown in FIGS. 3 and 4 comprising a disc-like structure having a central portion 304 embodied herein by an aperture for receiving the spindle 300, an outer rim portion 305 for receiving the cutting members 120, and a web portion 306, having a web portion upper surface 309, lying between the central portion 304 and outer rim portion 305. With further reference to FIG. 3, the base member 125 comprises a substantially planar structure and includes a sloped leading edge 310 to assist in the transfer of the severed trees unto the base member 125. Likewise, with reference to FIG. 4, the accumulation member 126 also comprises a substantially planar structure having a greater thickness adjacent the web portion upper surface 309 than adjacent the outer rim portion 305. As shall become apparent as this disclosure progresses, this arrangement allows for the provision of a base member 125 and accumulation member 126 having co-planer respective top surfaces 129,130 while preventing contact between the accumulation member 126 and cutting members 120 when the accumulation area 128 contains severed trees.

Figure 5:
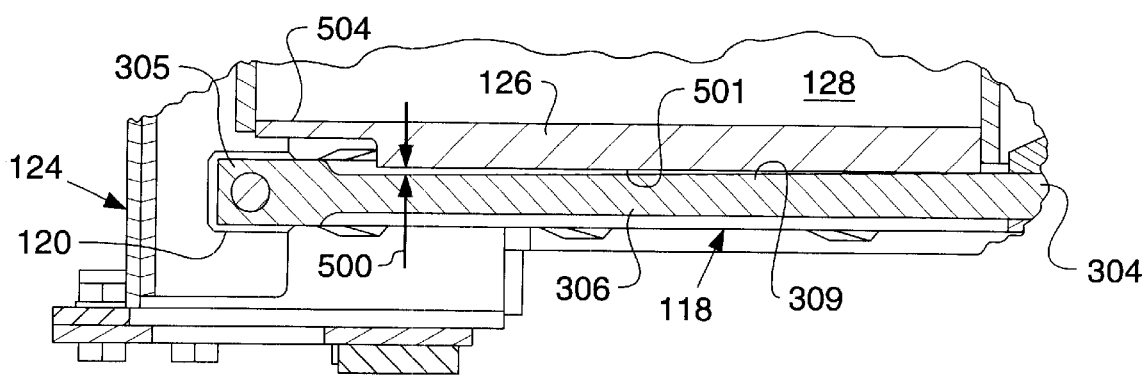
FIG. 5 is an enlarged cross-sectional view taken from FIG. 3.

FIG. 5 is an enlarged partial cross-sectional view taken from FIG. 3. For purposes of brevity the following discussion will focus upon the relationship between the accumulation member 126 and cutting device 118, however, the following discussion will equally apply to the relationship between the base member 125 and cutting device 118. As shown, in an embodiment of the present invention a separation distance or gap 500 is provided between the web portion upper surface 309 and a bottom surface 501 of the accumulation member 126 which increases from a position adjacent the central portion 304 to the outer rim portion 305. Such an arrangement may also assist in providing the aforementioned benefit of preventing an outer perimeter 504 of the accumulation member 126 from contacting the cutting members 120 as trees are loaded into the accumulation area 128.

Figure 6:
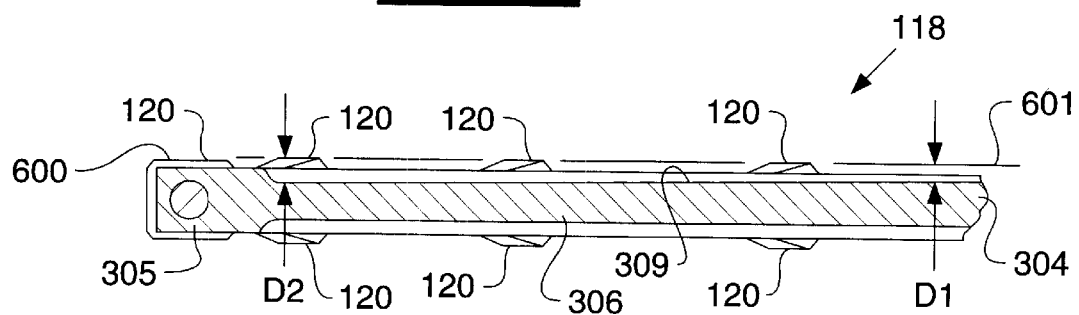
FIG. 6 is a cross-sectional view of an embodiment of the cutting device of the present invention.
Figure 7:
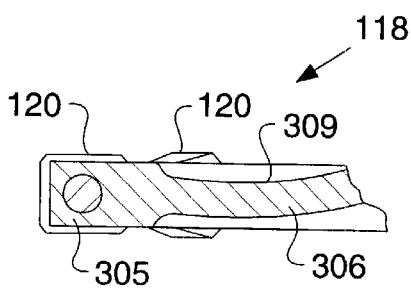
FIG. 7 is a cross-sectional view of yet another embodiment of the cutting device of the present invention.
Figure 8:
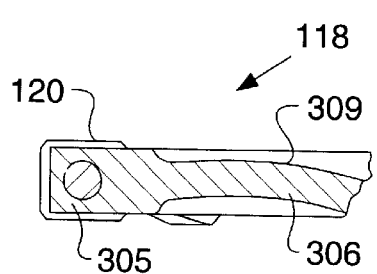
FIG. 8 is a cross-sectional view of even yet another embodiment of the cutting device of the present invention.

Shown in FIGS. 6–8 are exemplary embodiments showing an assortment of configurations for the cutting device 118 which may be utilized to provide the above-described configuration of the gap 500. With reference to FIG. 6, an upper surface 600 of the cutting members 120 define an upper cutting plane denoted by the reference numeral 601. To provide gap 500, the web portion upper surface 309 adjacent the central portion 304 is separated from the upper cutting plane 601 by a first distance denoted D1. Likewise, the web portion upper surface 309 adjacent the outer rim portion 305 is separated from the upper cutting plane 601 by a second distance denoted D2 which is greater than the first distance D1. For the embodiment illustrated and described with respect to FIG. 6, the aforementioned different distances D1 and D2 are provided by providing the cutting device 118 with a web portion 306 having a thickness which decreases from the central portion 304 to the outer rim portion 305. However, with reference to FIGS. 7 and 8, it is contemplated that other arrangements for the cutting device may also provide this arrangement. For example, the embodiment shown in FIG. 7 teaches an arrangement in which the web portion upper surface 309 is substantially concave; and FIG. 8 shows an arrangement in which the web portion upper surface 309 is substantially convex.

Industrial Applicability

With reference to FIG. 9, the harvesting apparatus 100 of the present invention is used in conjunction with a carrier vehicle (not shown) to sever and transport trees. Activation of the cutting device 118 by the operator causes the tree 900 to be severed. Simultaneously therewith, the tree 900 is forced up the sloped leading edge 310 of the base member 125 by the movement of the harvesting apparatus 100 in the direction of the tree 900. Simultaneously therewith, hydraulic pressure is provided to each of the first and second hydraulic cylinders 113,114, causing the respective grapple and collector arms 106,107 to pivot about their respective pivot points 904,905, thereby forcing the severed tree 900 onto the base member 125. Continued actuation of the respective grapple and collector arms 106,107 forces the tree 900 into the accumulation area 128 and into approximately the position shown.

The above-identified process may be repeated if it is desired to sever subsequent trees, such as tree 908, while maintaining tree 900 in the accumulation area 128. Once the tree 908 is severed as set forth above, the collector arm 107 is withdrawn from its engagement with tree 900 by reversing the hydraulic flow to the second hydraulic cylinder 114. Simultaneously with the withdraw of the collector arm 107, the grapple arm 106 is activated so as to force the tree from the base member 125 to the accumulation member 126 causing tree 908 to contact the articulable portion 109 of the collector arm 107. The contact of the tree 908 with the articulable portion 109 causes the articulable portion 109 to rotate about pivot point 110 in the direction of the arrow 909; thereby un-tucking the collector arm 107 from between tree 900 and 908. Once un-tucked, the grapple arm 106 continues to position tree 908 into the accumulation area 128 adjacent tree 900. Once positioned, the collector arm 107 can once again be moved into a contact position with trees 900 and 908 in the aforementioned manner so as to secure the trees 900,908 for transport. The process described herein may be repeated if desired until the accumulation area 128 is full. As should be appreciated by those of ordinary skill in such art, by providing the harvesting apparatus 100 with a base member 125 and accumulation member 126 having co-planar respective top surfaces 129,130, the severed tree 900 may more easily be transported into the accumulation area 128. Furthermore, and with reference to FIG. 5, by providing a gap 500 between the web portion upper surface 309 and a bottom surface 501 of the accumulation member 126 that increases from a position adjacent the central portion 304 to the outer rim portion 305, the accumulation member 126 may extend over the cutting members 120, thereby providing a larger accumulation area 128 to accumulate and store severed trees.

Other aspects, objects and advantages of this invention can be obtained from a study of the drawings, the disclosure and the appended claims.

What is claimed is:

1. A harvesting apparatus for harvesting trees, comprising:
   a frame member;
   a cutting device mounted to said frame member;
   at least one cutting member attached to said cutting device;
   a base member partially overlaying said cutting device;
   a tree accumulation member adjacent to said base member and co-planar therewith; and
   said tree accumulation member extending over at least a portion of said cutting member.

2. The harvesting apparatus as set forth in claim 1 further comprising a tree securing device coupled to said frame member.

3. The harvesting apparatus as set forth in claim 2 wherein said tree securing device comprises at least one arm.

4. The harvesting apparatus as set forth in claim 2 wherein:
   said tree securing device comprises at least two arms;
   said frame member includes a first side and a second side; and
   at least two arms are coupled to said frame member on one of said first side or said second side.

5. The harvesting apparatus as set forth in claim 2, wherein:
   said tree securing device comprises at least two arms;
   said frame member includes a first side and a second side; and
   at least one said of arm is coupled to said frame member on said first side, and at least one said arm is coupled to said frame member on said second side.

6. The harvesting apparatus as set forth in claim 1 wherein said cutting device comprises a circular saw.

7. The harvesting apparatus as set forth in claim 1 wherein said base member and said tree accumulation member comprise a unitary structure.

8. A harvesting apparatus for harvesting trees, comprising:
   a frame member;
   a cutting device, mounted to said frame member, having a central portion and an outer rim portion;
   a support plate partially overlaying said cutting device; and
   said cutting device being separated from said support plate by a separation distance wherein said separation distance increases from a location adjacent said central portion to said outer rim portion.

9. The harvesting apparatus as set forth in claim 8 wherein:
   said support plate comprises a tree accumulation member and a base member; and
   a top surface of said tree accumulation member is substantially co-planar with a top surface of said base member.

10. The harvesting apparatus as set forth in claim 8 further comprising at least one cutting member attached to said cutting device.

11. The tree harvesting apparatus as set forth in claim 10 wherein said support plate extends over at least a portion of said cutting member.

12. The harvesting apparatus as set forth in claim 8 further comprising a tree securing device coupled to said frame member.

13. The harvesting apparatus as set forth in claim 12 wherein said tree securing device comprises at least one arm.

14. The harvesting apparatus as set forth in claim 12 wherein:
   said tree securing device comprises at least two arms;
   said frame member includes a first side and a second side; and
   at least two said arms are coupled to said frame member on one of said first side or said second side.

15. The harvesting apparatus as set forth in claim 12, wherein:
   said tree securing device comprises at least two arms;
   said frame member includes a first side and a second side; and
   at least one of said arm is coupled to said frame member on said first side, and at least one of said arms is coupled to said frame member on said second side.

16. A cutting device for felling trees and for use with a cutting member attachable to the cutting device, the cutting member defining an upper cutting plane, comprising:
   a central portion;
   an outer rim portion adapted to receive the cutting member;
   a web portion, having a web portion upper surface, located between said central portion and said outer rim portion;
   said web portion upper surface separated from said upper cutting plane adjacent said central portion by a first distance;
   said web portion upper surface separated from said upper cutting plane adjacent said outer rim portion by a second distance; and
   said second distance being greater than said first distance.

17. The cutting device as set forth in claim 16 wherein said web portion has a thickness decreasing from said central portion to said outer rim portion.

18. The cutting device as set forth in claim 16 wherein said web portion upper surface is substantially concave.

19. The cutting device as set forth in claim 16 wherein said web portion upper surface is substantially convex.

* * * * *